(12) United States Patent
Bellenger

(10) Patent No.: US 6,256,306 B1
(45) Date of Patent: *Jul. 3, 2001

(54) ATOMIC NETWORK SWITCH WITH INTEGRATED CIRCUIT SWITCH NODES

(75) Inventor: Donald M. Bellenger, Los Altos Hills, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/089,838

(22) Filed: Jun. 3, 1998

Related U.S. Application Data

(63) Continuation of application No. 08/698,745, filed on Aug. 16, 1996, now Pat. No. 5,802,054.

(51) Int. Cl.[7] .................................................. H04L 12/66
(52) U.S. Cl. ........................................... 370/389; 370/401
(58) Field of Search .................................... 370/351, 400, 370/401, 402, 407, 408, 422, 389, 392, 395–399, 356, 360, 465, 466, 467, 229–237

(56) References Cited

U.S. PATENT DOCUMENTS

| | | | |
|---|---|---|---|
| 5,390,173 | * | 2/1995 | Spinney et al. ...................... 370/401 |
| 5,477,547 | * | 12/1995 | Sugiyama ............................ 370/401 |
| 5,610,905 | * | 3/1997 | Murthy et al. ....................... 370/401 |
| 5,657,314 | * | 8/1997 | McClure et al. ..................... 370/401 |

* cited by examiner

Primary Examiner—Ajit Patel
(74) Attorney, Agent, or Firm—McDonnell Boehnen Hulbert & Berghoff

(57) ABSTRACT

An atomic type switch mesh is combined with standard local area network links, such as high speed Ethernet, and a bridge-like protocol to provide a high performance scalable network switch. The network switch comprises a plurality of switch nodes, a first set of communication links which are coupled between switch nodes internal to the network switch, and a second set of communication links which comprise network links from switch nodes on the border of the network switch to systems external to the network switch. The respective switch nodes include a set of ports (having more than two members) which are connected to respective communication links in either the first or second set of communication links. Each port in the set comprises a medium access control (MAC) logic unit for a connectionless network protocol, preferably high speed Ethernet. The switch nodes also include a route table memory which has a set of accessible memory locations that store switch route data specifying routes through the plurality of switch nodes within the boundaries of the network switch. Flow detect logic is coupled with the set of ports on the switch node, which monitors frames received by the set of ports and generates an identifying tag for use in accessing the route table memory. Finally, the switch node includes node route logic which is coupled with the flow detect logic, the route table memory and the set of ports. The node route logic monitors frames received by the set of ports to route a received frame for transmission out a port in the set of ports.

52 Claims, 6 Drawing Sheets

ATOMIC NETWORK SWITCH WITH INTEGRATED CIRCUIT SWITCH NODES

This application is a continuation of patent application Ser. No. 08/698,745 filed Aug. 16, 1996 now U.S. Pat. No. 5,802,054.

BACKGROUND OF THE INVENTION

1. Field of the Invention

The present invention relates to the field of network intermediate devices, and more particularly to high-performance switches for routing data in computer networks.

2. Description of Related Art

Network intermediate systems for interconnecting networks include various classes of devices, including bridges, routers and switches. Systems for the interconnection of multiple networks encounter a variety of problems, including the diversity of network protocols executed in the networks to be interconnected, the high bandwidth required in order to handle the convergence of data from the interconnected networks at one place, and the complexity of the systems being designed to handle these problems. As the bandwidth of local area network protocols increases, with the development of so-called asynchronous transfer mode ("ATM"), 100 Megabit per second Ethernet standards, and proposals for gigabit per second Ethernet standards, the problems encountered at network intermediate systems are being multiplied.

One technique which has been the subject of significant research for increasing the throughput of networks is known as the so-called atomic LAN. The atomic LAN is described for example in Cohen, et al., "ATOMIC: A Low-Cost, Very High-Speed, Local Communication Architecture", 1993 International Conference on Parallel Processing. There is a significant amount of published information about the atomic LAN technology. Felderman, et al. "ATOMIC: A High-Speed Local Communication Architecture", *Journal of High Speed Networks*, Vol. 1, 1994, pp. 1–28; Cohen, et al., "ATOMIC: A Local Communication Network Created Through Repeated Application of Multicomputing Components", DARPA Contract No. DABT63–91-C-001, Oct. 1, 1992; Cohen et al., "The Use of Message-Based Multicomputer Components to Construct Gigabyte Networks"; DARPA Contract No. DABT63-91-C-001, published Jun. 1, 1992; Finn, "An Integration of Network Communications with Workstation Architecture", ACM, A Computer Communication Review, October 1991; Cohen et al. "ATOMIC: Low-cost, Very-High-Speed LAN", DARPA Contract No. DABT63-91-C-001 (publication date unknown, downloaded from Internet on or about May 10, 1996).

The atomic LAN is built by repeating simple four port switch integrated circuits in the end stations, based on the well known Mosaic architecture created at the California Institute of Technology. These integrated circuits at the end stations are interconnected in a mesh arrangement to produce a large pool of bandwidth that can cross many ports. The links that interconnect the switches run at 500 megabits per second. Frames are routed among the end stations of the network using a differential source route code adapted for the mesh. One or more end stations in the mesh act "address consultants" to map the mesh and calculate source route codes. All of the links are self timed, and depend on acknowledged signal protocols to coordinate flow across the links to prevent congestion. The routing method for navigating through the mesh, known as "worm hole" routing is designed to reduce the buffering requirements at each node.

The atomic LAN has not achieved commercial application to a significant degree, with an exception possibly in connection with a supercomputer known as Paragon from Intel Corporation of Santa Clara, Calif. Basically it has been only a research demonstration project. Critical limitations of the design include the fact that it is based on grossly non-standard elements which make commercial use impractical. For example, there is no way to interface the switch chips taught according to the atomic LAN project with standard workstations. Each workstation needs a special interface chip to become part of the mesh in order to participate in the LAN. Nonetheless, the ATOMIC LAN project has demonstrated a high throughput and readily extendable architecture for communicating data.

Typical switches and routers in the prior art are based on an architecture requiring a "backplane" having electrical characteristics that are superior to any of the incoming links to be switched. For example, 3Com Corporation of Santa Clara, Calif., produces a product known as NetBuilder2, having a core bus backplane defined which runs at 800 megabits per second. This backplane moves traffic among various local area network external ports.

There are several problems with the backplane approach typical of prior art intermediate systems. First, the backplane must be defined fast enough to handle the largest load that might occur in the intermediate system. Furthermore, the customer must pay for worst case backplane design, regardless of the customer's actual need for the worst case system. Second, the backplane itself is just another communication link. This communication link must be completely supported as a backplane for the network intermediate system, involving intricate and expensive design. The lower volumes for specialized backplane link further increases the cost of network intermediate systems based on the backplane architecture.

In light of the ever increasing complexity and bandwidth requirements of network intermediate systems in commercial settings, it is desirable to apply the atomic LAN principles in practical, easy to implement, and extendable network intermediate systems.

SUMMARY OF THE INVENTION

According to the present invention, the fine scalability of an atomic type LAN mesh, is combined with standard local area network links, such as high speed Ethernet, and a standard routing protocol to provide a high performance scalable network switch. The need for the special purpose backplane bus is removed according to this architecture, while providing scalability, high performance, and simplicity of design.

Accordingly, the present invention can be characterized as a network switch that comprises a plurality of switch nodes arranged in a mesh, a first set of internal communication links which are coupled between switch nodes internal to the network switch, and a second set of external communication links which comprise network links from switch nodes on the border of the network switch to systems external to the network switch. The respective switch nodes include a set of ports (having more than two members) which are connected to respective communication links in one of the first or second sets of communication links. The ports in the set of ports include respective medium access control (MAC) units for transmission and reception of data frames according to a network protocol, preferably a connectionless protocol like high speed Ethernet, and are connectable to a port on another network switch node inside the mesh across an internal communication link, or to a network communication medium outside the mesh which constitutes, or is coupled with, an external communication link.

The switch nodes also include resources to execute a routing process for frames inside the mesh. These resources include a route table memory which has a set of accessible memory locations that store switch route data specifying routes through the plurality of switch nodes inside the mesh of the network switch for specific flows of data frames, or for data frames having specific destination addresses. Flow detect logic is coupled with the set of ports on the switch node, which monitors frames received by the set of ports and generates an identifying tag for use in accessing the route table memory. Example tags consist of a destination address at one of the data link layer or the network layer, a portion of the destination address, or hash values based on one or more fields in control segments of the frame. The tags preferably act as flow signatures to associate a frame with a sequence of frames traversing the switch. For example, when a large file is transferred, a sequence of frames is generated which constitutes a flow of data to a single destination, and frames in the sequence have a single identifying tag. Finally, the switch node includes node route logic which is coupled with the flow detect logic, the route table memory and the set of ports. The node route logic monitors frames received by the set of ports to route a received frame for transmission out a port in the set of ports.

The node route logic determines whether the received frame includes a switch route field that indicates a port in the set of ports to which the frame should be directed for transmission. If the received frame includes a switch route field, that field is updated according to a source route type protocol, and the frame is forwarded with the updated switch route field out the indicated port. If the received frame does not include a switch route field, such as would normally be the case for a frame entering the network switch at a switch node on the border of the network switch, then the identifying tag generated by the flow detect logic is used to access the route table memory. Switch route data is retrieved from the route table memory, if an entry exists for the identifying tag of the current frame. This data is used to generate a switch route field for the frame, and to direct the frame out a port indicated by the data.

The node route logic on the respective switch node also includes logic that forwards a received frame for transmission on a default port in the set of ports, when the route table memory does not include switch route data for the identifying tag. The default port is coupled to a route leading to a processor in the system at which switch route data is generated, such as a multi-protocol network router either internal or external to the network switch. Thus, the node route logic further includes logic to receive switch route data from a remote system for a particular identifying tag. This switch route data is stored in the route table memory in association with the particular identifying tag. When a new entry is made in a switch route table, frames having the particular identifying tag are blocked, with or without buffering, until notification is received that it is clear to forward frames having the particular identifying tag. This blocking technique allows the remote system to which a frame was directed for routing, to forward the frame to its destination, prior to other frames in the same flow sequence being routed to that destination. This preserves the order of transmission of frames in a particular flow. The node route logic begins forwarding frames according to the switch route data stored in the route table memory for a particular tag after it receives notification from the remote system that it is clear to forward frames.

The term frame is used herein, unless stated otherwise, in a generic sense as a unit of data transferred according to a network protocol, intending to include data units called frames, packets, cells, strings, or other names which may have more specific meaning in other contexts.

In the preferred system, all the ports on the switch node execute a single local area network protocol. Preferably this protocol is an Ethernet protocol like the carrier sense, multiple access with collision detection CSMA/CD protocol of the widely used Ethernet standard and variants of it. More preferably, the protocol is specified for operation at 100 Megabits per second or higher, more preferably at the emerging one gigabit per second Ethernet standard protocol. For example, half duplex and full duplex "Gigabit" Ethernet (IEEE802.3z) or 100 Megabit Ethernet (802.3u) are used in preferred embodiments.

Flow control between the nodes is handled according to the standard LAN protocol of the ports, such as the Ethernet protocol. Thus, management of the frame flow through the switch is conducted on a frame by frame basis with the format of the frame inside the switch essentially unaltered from the format entering or exiting the switch, with well understood and easily implemented technology.

According to another aspect of the present invention, the flow detect logic on the respective switch nodes comprises logic which computes a plurality of hash values in response to respective sets of control fields in a received frame. The respective sets of control fields correlate with different network frame formats which might be encountered in the network. Logic is also included which determines a particular network frame format for a received frame, and selects one of the plurality of hash values as the identifying tag in response to the particular network frame format that has been detected. The hash values preferably comprise cyclic redundancy codes which are generated with hardware CRC generators. In this manner, the identifying tag for an incoming frame is generated very quickly, allowing for cut through of frames in a switch node so that a transmission of a frame on an outgoing port can begin before the complete frame has been received at the incoming port.

The present invention can also be characterized as individual switch nodes for use in a network switch in the configuration described above. In another aspect, the network switch node comprises an integrated circuit on which the plurality of ports, the flow control logic, and the flow detect logic are incorporated, and interconnected by an embedded high speed bus. A system including any two or more of such integrated circuits combined together to form a mesh, provide a network switch. According to another aspect of the invention, the ports on the integrated circuits are coupled with standard jack connectors, or other standard connector interfaces, allowing users of switch circuits including a plurality of integrated circuits to connect them together using cables in any desired configuration. Thus, a very flexible switch architecture is provided which can be configured for individual installations very easily.

A high performance network switch is provided according to the present invention based on a switch node made with an integrated circuit having 3 or more LAN ports. A frame is routed amongst the nodes in the switch without moving across any intermediate non-LAN bus (excluding the memory interface in each of the nodes used for the frame buffers). A route decision is made in each node based on a switch route header attached to the LAN frame, or on the Ethernet address contained within the frame, or directed to a default route if no route is stored in the route table and the Ethernet address is unknown. The flow control amongst the nodes in the switch is handled based on standard LAN control signals. In the preferred system, the standard LAN interface amongst the nodes is 100 Megabit per second or higher Ethernet, and more preferably the emerging 1 gigabit per second Ethernet protocol.

Other aspects and advantages of the present invention can be seen upon review of the drawings, the detailed description and the claims which follow.

DETAILED DESCRIPTION

Figure 1:
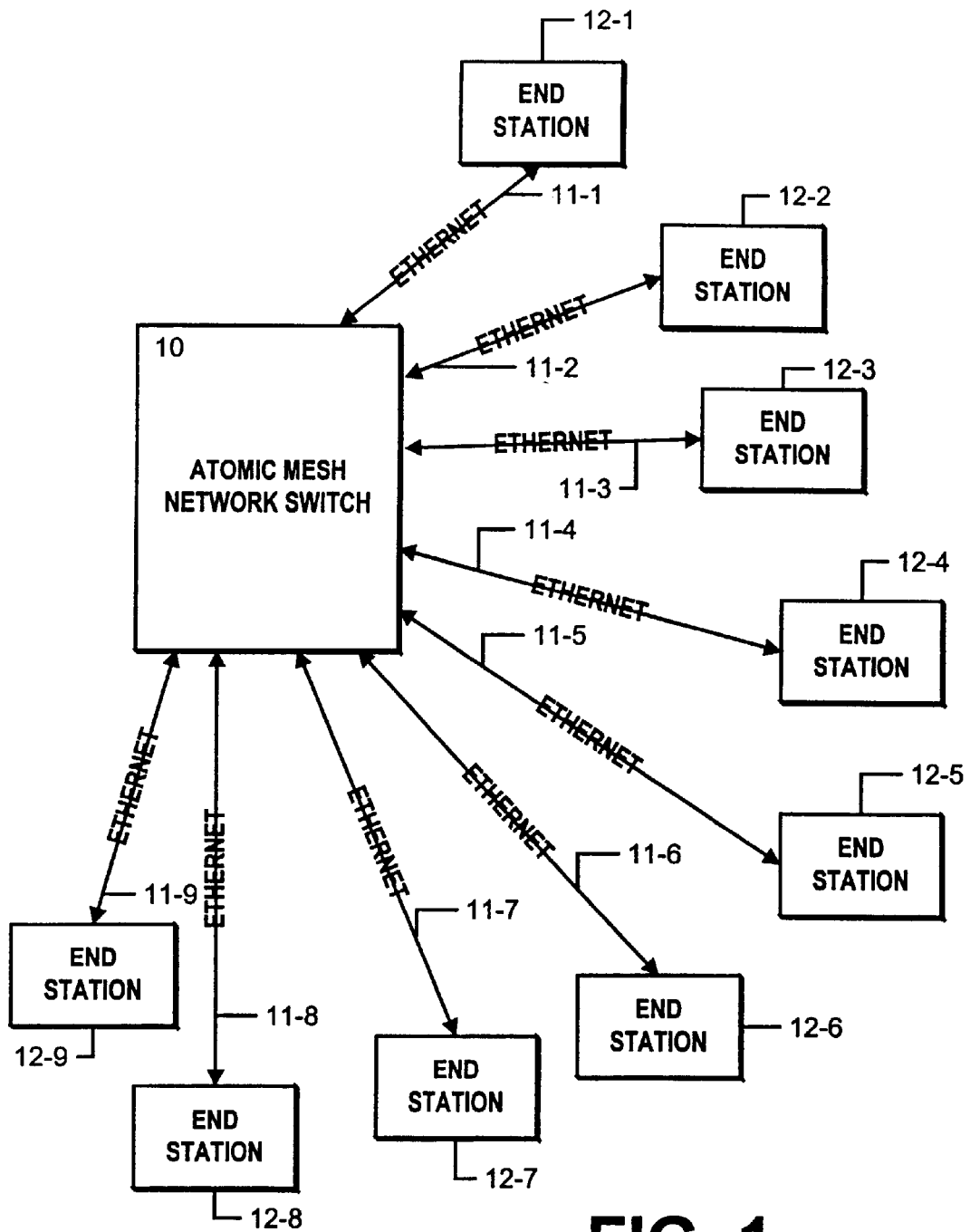
FIG. 1 is a simplified diagram of a network including an atomic network switch according to the present invention, interconnecting a plurality of standard Ethernet links.

A detailed description of embodiments of the present invention is provided with reference to FIGS. 1 through 7, where FIG. 1 illustrates the context in which the present invention is utilized. In FIG. 1, an atomic network switch 10 according to the present invention is connected by standard Ethernet links 11-1 through 11-9 to a plurality of end stations 12-1 through 12-9. The number of end stations and Ethernet links shown in FIG. 1 is arbitrary. A larger or smaller number of links could be connected to a single atomic switch 10 according to the present invention, as described in detail below. Furthermore, the connections 11-1 through 11-9 from the atomic switch to the respective end stations are all standard network connections, preferably CSMA/CD protocol links, such as the standard full duplex fast Ethernet (IEEE802.3u) specified for 100 megabits per second each way, or the emerging standard full duplex, 1 gigabit per second Ethernet protocol. In the preferred system, all links 11-1 through 11-9 operate according to the same network protocol. However, alternative systems accommodate multiple network protocols on the external ports of switch 10.

The end stations 12-1 through 12-9 may be personal computers, high performance workstations, multimedia appliances, printers, network intermediate systems coupled to further networks, or other data processing devices as understood in the art.

According to one embodiment of the present invention one of the end stations, such as end station 12-1 includes resources to manage the configuration of the atomic network switch 10, such as initializing route tables, maintaining the route tables, and providing other functions. Thus, end station 12-1 may include resources to act as a multi-protocol router, such as the NetBuilder2 manufactured by 3Com Corporation of Santa Clara, Calif.

Figure 2:
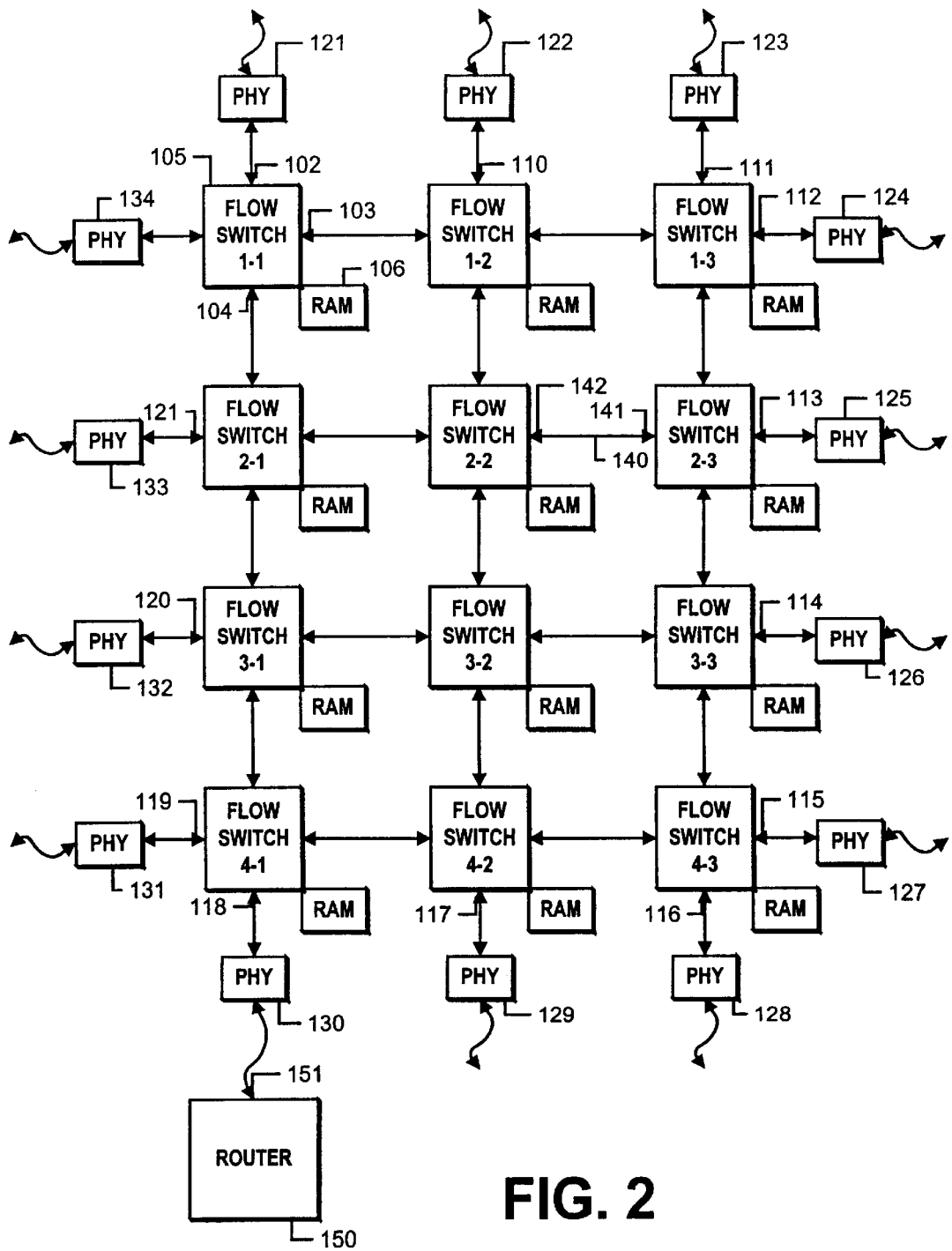
FIG. 2 is a block diagram of a network switch based on a mesh of switch nodes according to the present invention.

FIG. 2 illustrates the internal architecture of the atomic network switch 10 shown in FIG. 1. The atomic network switch 10 is comprised of a plurality of switch nodes arranged in rows and columns in FIG. 2. The switch nodes are labeled in the drawing by column and row numbers. Thus, the switch node in the upper left hand corner is node 1-1. The switch node at row 1, column 2 is node 1-2, and so on throughout the mesh. In a preferred embodiment, each switch node includes an integrated circuit, such as integrated circuit 105 in node 1-1, coupled to a memory chip, such as chip 106 in node 1-1. Each of the nodes includes four ports. Thus, node 1-1 includes port 101, port 102, port 103, and port 104.

The boundary of the network switch in FIG. 2 comprises the nodes 101 and 102 of node 1-1, port 110 of node 1-2, port 111 of node 1-3, 112 of node 1-3, port 113 of node 2-3, port 114 of node 3-3, port 115 of node 4-3, port 116 of node 4-3, port 117 of node 4-2, port 118 of node 4-1, port 119 of node 4-1, port 120 of node 3-1, and port 121 of node 2-1. Each of the ports 110–121, 101 and 102 on the boundary of the switch is connected to through a physical layer device, 121–134 to respective physical communication media, such as fiberoptic cables, twisted pair cables, wireless links, such as radio frequency or infrared channels, or other media specified according to standard local area network physical layer specifications. The connection between switch nodes, such as the connection 140 between port 141 on node 2-3 and port 142 on node 2-2, consist of medium independent interface connections which are defined for connection between MAC logic on a port, and medium dependent components for a port. However, these medium independent connections are connected from MAC logic to MAC logic directly. Preferably all the links between the ports in the network switch execute the same network protocol as the ports on the boundary of the switch. However, alternative systems support multiple protocol types at the boundary.

Management of the configuration of the network switch is accomplished in a router 150 which is connected across link 151 to the physical layer device 130 on the network switch.

The memory chips, such as chip 106 at node 1-1, in the network switch are used to store route tables, and as frame buffers used in routing of frames amongst the nodes of the switch.

In operation, the network switch receives and transmits standard LAN frames on physical interfaces 121-134. Preferably, the LAN interconnections comprise CSMA/CD LANs, such as 100 Megabit Ethernet (IEEE802.3 u), or 1 gigabit Ethernet. When a standard frame enters the switch at one physical interface, it is directed out of the switch through another physical interface as indicated by the address data carried by the frame itself The individual nodes in the switch include a switch routing feature. Each individual node selects a port on which to transmit a received frame based upon the contents of the header of the incoming frame.

There are two internal modes for routing frames inside the switch. In the base mode, each node routes frames using a switch route header attached to the beginning of the regular LAN frame. The switch route header in one example consists of a series of bytes, each byte specifying one or more hops of the route. The top two bits in one byte specify a direction, in the next bits specify the distance. As a frame moves through each node, the header is updated until it reaches the target. Before a frame leaves the mesh, all the switch route bytes are stripped, and the frame has the same format as it had when it entered the mesh or, if required, a format adapted to the network protocol of the exit port.

The nodes of the switch, at least nodes on the boundary of the switch, also have a look up mode. When a frame enters the switch, with no source route header, the Ethernet addresses, or other fields of the control header of the frame are utilized access the route table. In preferred systems, a CRC-like checksum generator is run over the header of the frame, or over selected fields in the header. At the end of the header, the checksum, or the low order bits of the checksum, are used as a hash code to access a route table stored in the memory associated with the node. Other look up techniques could be utilized for accessing the route table in the memory. For example, the destination address of the incoming frame could be used directly as an address in the table.

If there is an entry in the route table corresponding to the header of the frame, then the switch route data from the table is used to create a switch route header. The header is attached to the frame, and the frame is transmitted at the appropriate port. If no entry is found in the route table, then the frame is routed to a default address, such as the address of a multiprotocol router associated with the switch. The multiprotocol router at the default address also performs management functions such as reporting status, initializing the network, broadcast functions, and managing node route tables. Routing the frame to a default address alternatively involves attachment of a switch route header to direct the frame to the default address, or simply forwarding the frame at a default port in the local node, such that the next node in the mesh to receive the frame also looks it up in its own route table to determine whether the frame is recognized. Either way, the frame reaches the default address and is handled appropriately.

Flow control of the frames in the mesh, and at the boundary of the mesh, is based on the network protocol of the links, such as Ethernet. Therefore, in the preferred Ethernet example, if a port is not available in a target node due to a busy link, a collision on the link, or lack of memory space at the target node, the frame will be refused with a jam signal or a busy signal on the link. The sending node buffers the frame, and retries the transmission later, according to the backoff and retry rules of the protocol or other flow control techniques of the protocol.

The standard higher-speed Ethernet protocols include both half duplex and full duplex embodiments. The 100 Megabit per second Ethernet, defined by IEEE802.3u, clause 31 "MAC Control," defines a frame-based flow control scheme for the full duplex embodiment. Flow control slows down the aggregate rate of packets that a particular port is sending. The method used revolves around control frames distinguished by a unique multicast address and a length/type field in the packet. When a MAC port controller detects that it has received a control frame, the opcode in the control frame is sensed, and transmission of packets is controlled based on the opcode. In existing specifications, a single opcode PAUSE is defined. Thus, in response to the PAUSE opcode, transmission of packets is either enabled or disabled depending on the current state in a Xon/Xoff type mechanism. Thus, this full duplex mode does not depend on the shared media, collision detect techniques of the classic CSMA/CD protocols.

All the proposed standards in the Ethernet family basically use the standard 802.3/Ethernet frame format, conformed to the 802.2 logical link control layer interface, and the 802 functional requirement document with the possible exception of Hamming distance. Also, the minimum and maximum frame size as specified by the current 802.3 standard and by the half or full duplex operational modes is different in the higher rate standards. Thus, the half and full duplex embodiments of the 100 Megabit per second and Gigabit per second Ethernet standards are often referred to as CSMA/CD protocols, even though they may not fit completely within the classic CSMA/CD definition.

Figure 3:
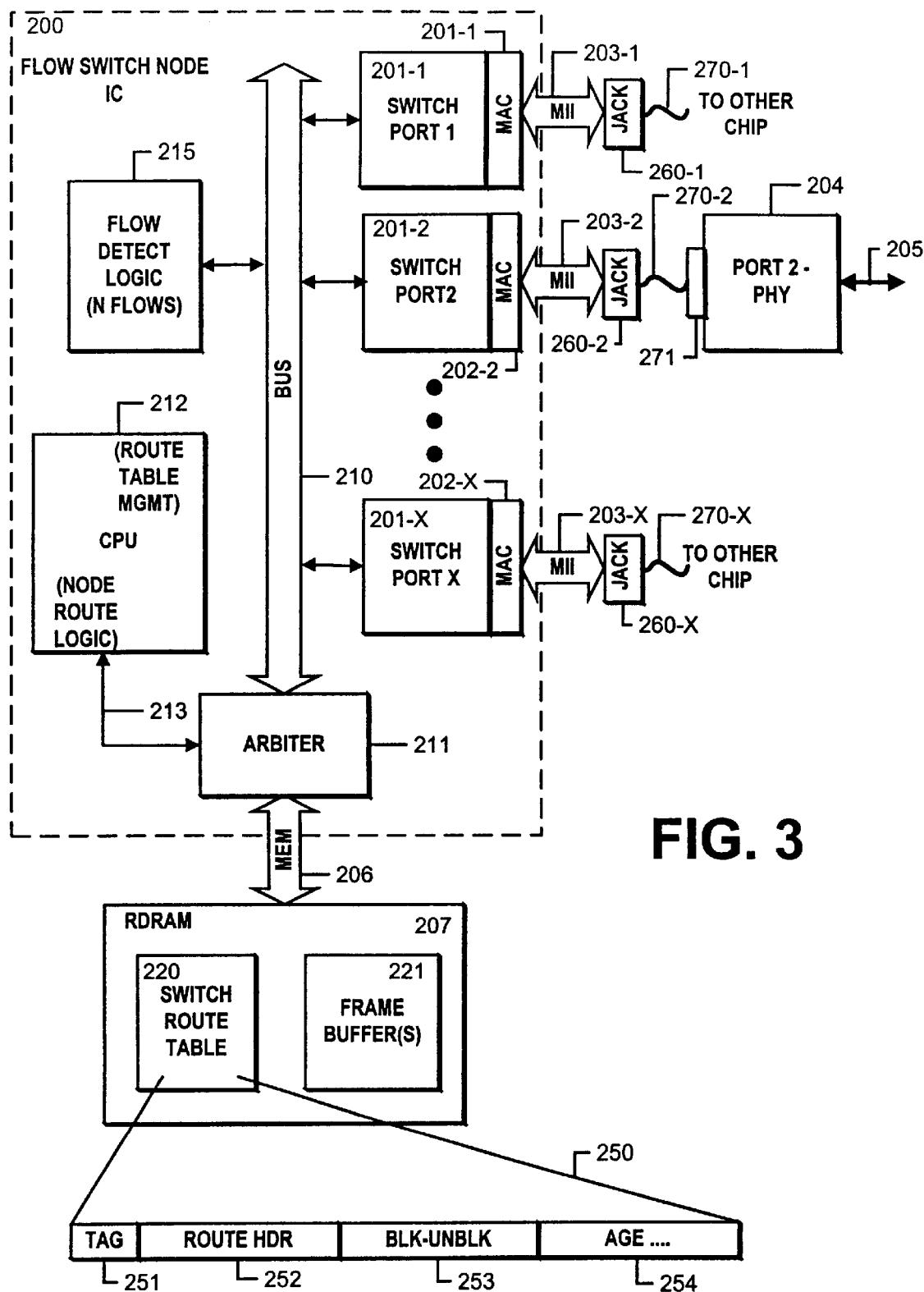
FIG. 3 is a block diagram of a switch node according to the present invention.

FIG. 3 is a simplified block diagram of a single node in the network switch according to the present invention. The node consists of an integrated circuit 200 comprising ports 201-1, 201-2, . . . 201-X. Each port includes the frame buffer and port management logic normally associated with standard bridges. Also, coupled to each of the ports, is a medium access control MAC unit 202-1, 202-2, . . . 202-X. The MAC units 202-1 to 202-X are coupled to medium independent interfaces MII 203-1, 203-2, . . . 203-X.

In the embodiment of FIG. 3, each of the medium independent interfaces is connected to a connector jack 260-1, 260-2, 260-X. The connector jacks comprise a standard connector to which a cable 270-1, 270-2, 270-X is easily connected by the user. The cable may comprise a coaxial cable for medium independent interfaces based on serial data, or ribbon cables for wider data buses. A variety of mechanical jack configurations can be used as known in the art. For example, coaxial stubs can be mounted on printed circuit boards adjacent each port of the integrated circuits. A short coaxial cable is then connected from stub-to-stub in order to arrange the plurality of integrated circuit chips in a mesh that suits the particular installation. Also, standard ribbon connector jacks can be surface mounted on printed wiring boards adjacent to the integrated circuit. The ribbon cables are connected into the ribbon connector jacks in order to establish the inter-connection.

In alternatives, each of the switches is mounted on a daughter board, with jacks designed to be connected to a mother board in which the data is routed according to the needs of the particular application. In alternative systems, the jacks 260-1 through 260-X are not included, and the medium independent interfaces are routed in the printed wiring board in a hard-wired configuration, designed for a particular installation.

Medium independent interfaces allow for communication by means of the jacks 260-1 to 260-X and cables 270-1 to 270X, or otherwise, directly with other MAC units on other switch integrated circuits, or to physical layer devices for connection to actual communication media For example, the MII 203-1 in FIG. 2 is connected directly to a port on another node in the switch. The MII 203-2 in FIG. 2 is connected to a physical layer device 204 for port 2 through jack 271. The physical layer device 204 is connected to a physical transmission medium 205 for the LAN being utilized. The MIE 203-X in FIG. 2 is coupled directly to another chip within the switch mesh.

According to one embodiment of the present invention, integrated circuit 200 includes a memory interface 206 for connection directly to an external memory, such as a Rambus dynamic random access memory RDRAM 207. The RDRAM 207 is utilized to store the switch route table 220, and for frame buffers 221 utilized during the routing of frames through the node.

The internal architecture of the integrated circuit 200 can take on a variety of formats. In one preferred embodiment, the internal architecture is based on a standard bus architecture specified for operation at I Gigabit per second, or higher. In one example, a 64 bit-wide bus 210 operating at 100 Megahertz is used, providing 6.4 Gigabits per second as a theoretical maximum. Even higher data rates are achievable with faster clocks. The integrated circuit of FIG. 3 includes bus 210 which is connected to a memory arbiter unit 211. Arbiter unit 211 connects the bus 210 to a CPU processor 212 across line 213. The processor 212 is utilized to execute the route logic for the node. Each of the switch ports 201-1 to 201-X is coupled to the bus 210, and thereby through the arbiter 211 to the CPU 212 and the memory interface 206. Also, flow detect logic 215 is coupled to the bus 210 for the purpose of monitoring the frame received in the node to detect flows, and to generate identifying tags for the purpose of accessing the switch route table in the RDRAM 207. The arbiter 211 provides for arbitration amongst the ports, the flow detect logic, the memory, and the CPU for access to the bus, and other management necessary to accomplish the high speed transfer data from the ports to the frame buffers and back out the port.

A representative location 250 of the switch route table is shown. The location 250 includes a field 251 for the identifying tag, a field 252 for the route header, a field 253 for a block-unblock control bit, and a field 254 or fields for information used in the management of the route table, such as the age of the entry. The tag field 251 may be associated with a location by one or more of using the tag or a portion of the tag in the address, by storing all or part of the actual tag data in the addressed location, or by using other memory tag techniques.

The route header in the preferred embodiment consists of a sequence of route bytes. The first field in a route byte includes information identifying a direction, which corresponds to a particular port on the node, and a second field in the byte includes a count indicating the number of steps through the switch from node to node which should be executed in the direction indicated by the first field. For example, an eight bit route byte in a switch having nodes with four ports, includes a two bit direction field, and a six bit count field, specifying up to 63 hops in one of four directions. A sequence of route bytes is used to specify a route through the switch. Thus, the switch route header uses source routing techniques within the switch for the purposes of managing flow frames through the switch. The source route approach may, for example, in a 4 port node include a field for hops to right, hops to the left, hops up and hops down. The first field may carry information indicating left 4 hops, followed by a field indicating down 2 hops, followed by a field indicating left one hop to exit the switch. Thus, a frame would be transmitted out the left and in the right port of 3 nodes, in the right and out the down port of 1 node, in the top and out the down of 1 node, and in the top and out the left of the last node on the boundary of the switch. A standard Ethernet frame format takes over for transmission through the network outside the switches. As the size of the mesh grows, and the bandwidth handled by the mesh increases, more sophisticated routing techniques are available because of the flexible technology utilized. For larger switches, more than one route exists for frames entering one node and leaving on another node. Thus, the switch can be configured to minimize the number of frames which are blocked in passage through the switch, while maintaining optimum utilization of the bandwidth available through the switch.

The block-unblock field 253 is used during the updating of the switch route table by the host CPU 212 to block routing of frames corresponding to new entries, until it is assured that the first frame in the flow to which the entry corresponds, arrives at its destination before the node begins forwarding following frames in the flow to the destination using the route header, in order to preserve the order of transmission of the frames. The age field 254 is used also by the CPU 212 for the purpose of managing the contents of the route table. Thus, entries which have not been utilized for a certain amount of time are deleted, or used according to least-recently-used techniques for the purposes of finding locations for new entries. Other control fields (not shown) include a field for storing a count of the number of packets forwarded by the node using this route, a drop/keep field to indicate packets that will be dropped during overflow conditions, a priority "high/low" field for quality of service algorithms, and additional fields reserved for future use, to be defined according to a particular embodiment.

The frame buffer 221 is preferably large enough to hold several frames of the standard LAN format. Thus, a standard Ethernet frame may comprise 1500 bytes. Preferably, the frame buffer 221 is large enough to hold at least one frame for each of the ports on the flow switch.

The flow switch 200 includes more than 2 ports, and preferably 4 or more ports. All the ports are either connected through the media independent interfaces 203-1 through 203-X directly to other chips in the mesh, or to physical layer devices for connection to external communication media.

The router or other management node for the switch may communicate with each of the nodes 200 using well-known management protocols, such as SNMP (simple network management protocol), enhancements of SNMP, or the like. Thus, the RDRAM 207 associated with each node also stores statistics and control data used by the management process in controlling the switch node.

Although in FIG. 3, the RDRAM 207 is shown off the chip 200, alternative embodiments incorporate memory into the switch integrated circuit 200, for more integrated design, smaller footprint for the switch, and other classic purposes for higher integration designs.

Figure 4:
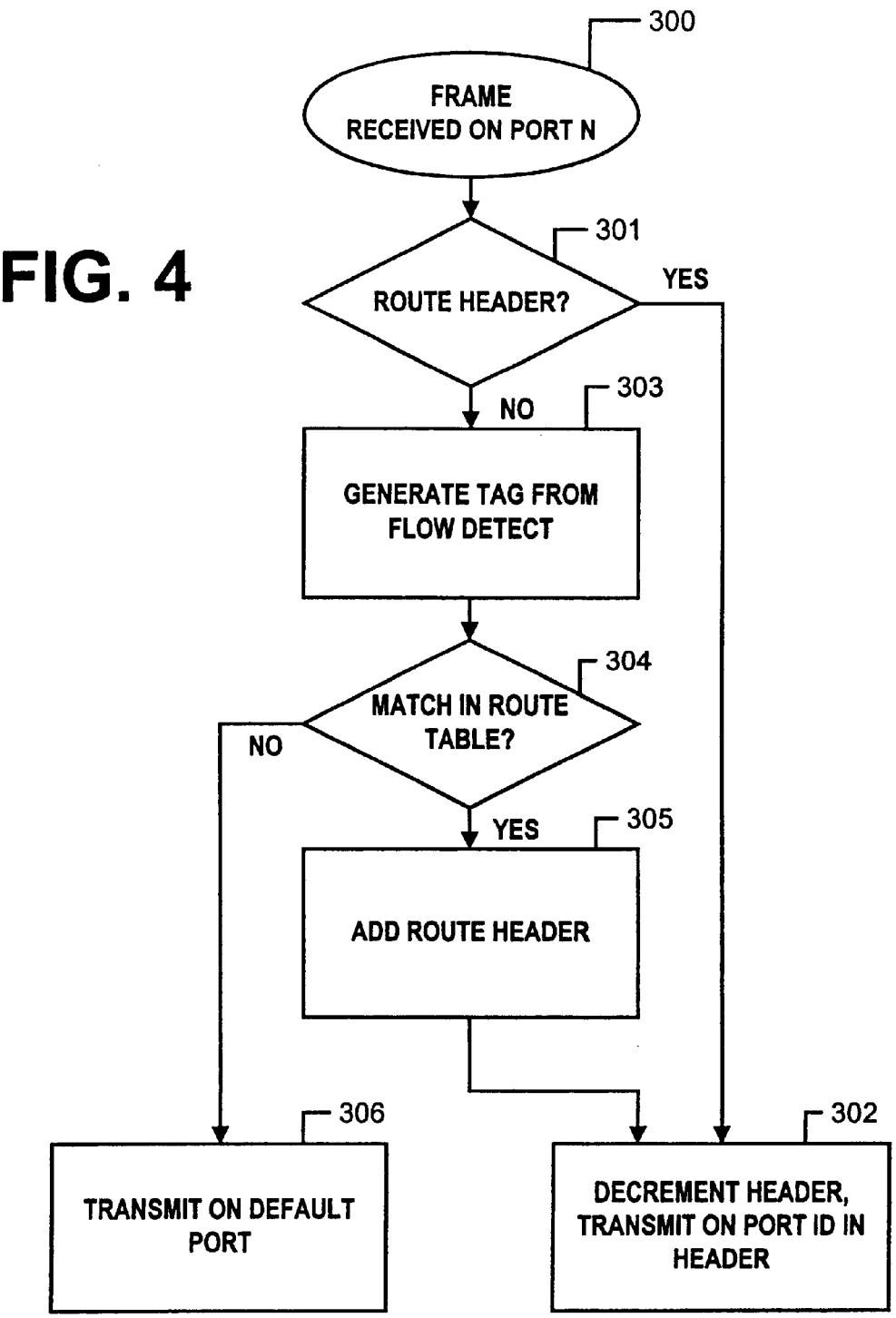
FIG. 4 is a flow chart illustrating the process executed by the node route logic in the switch node of FIG. 3.

The CPU 212 executes the node route logic for the node. A simplified flow chart of the node route process executed by CPU 211 is shown in FIG. 4.

The process begins with the receipt of the frame on a particular port (step 300). The CPU first determines whether the frame carries a route header (step 301). This process is executed in parallel with the transferring of the frame being received to the frame buffer of the node. If the frame carries a route header, then the CPU updates the header by decrementing the hop count, or otherwise updating the information to account for a traversed leg of the route according to the particular switch route technique utilized. The CPU transmits the frame (with updated header) on the port identified by the header (step 302). If at step 301, no switch route header was detected, the flow detect logic is accessed to determine a tag for the frame (step 303). The tag is utilized by the CPU to access entries in the route table (step 304). If a match is found in the route table, then a route header is generated for the frame (step 305). Then, the header is updated (if required), and the frame is transmitted on the port identified by the data in the table (step 302). If at step 304, no match was found in the route table, then the frame is transmitted on a default port (step 306). An alternative technique to transmitting the frame on a default port, is to add a default route header to the frame, and transmit the frame according to the information in the default route header. In this manner, subsequent nodes in the switch will not be required to perform the look-up operation for the purposes of routing the frame. However, it may be desirable to have each node look up the frame in its own route table, in order to insure that if any node already has data useful in forwarding the frame, then that frame will be forwarded appropriately without requiring processing resources of the management process at the default address.

Figure 5:
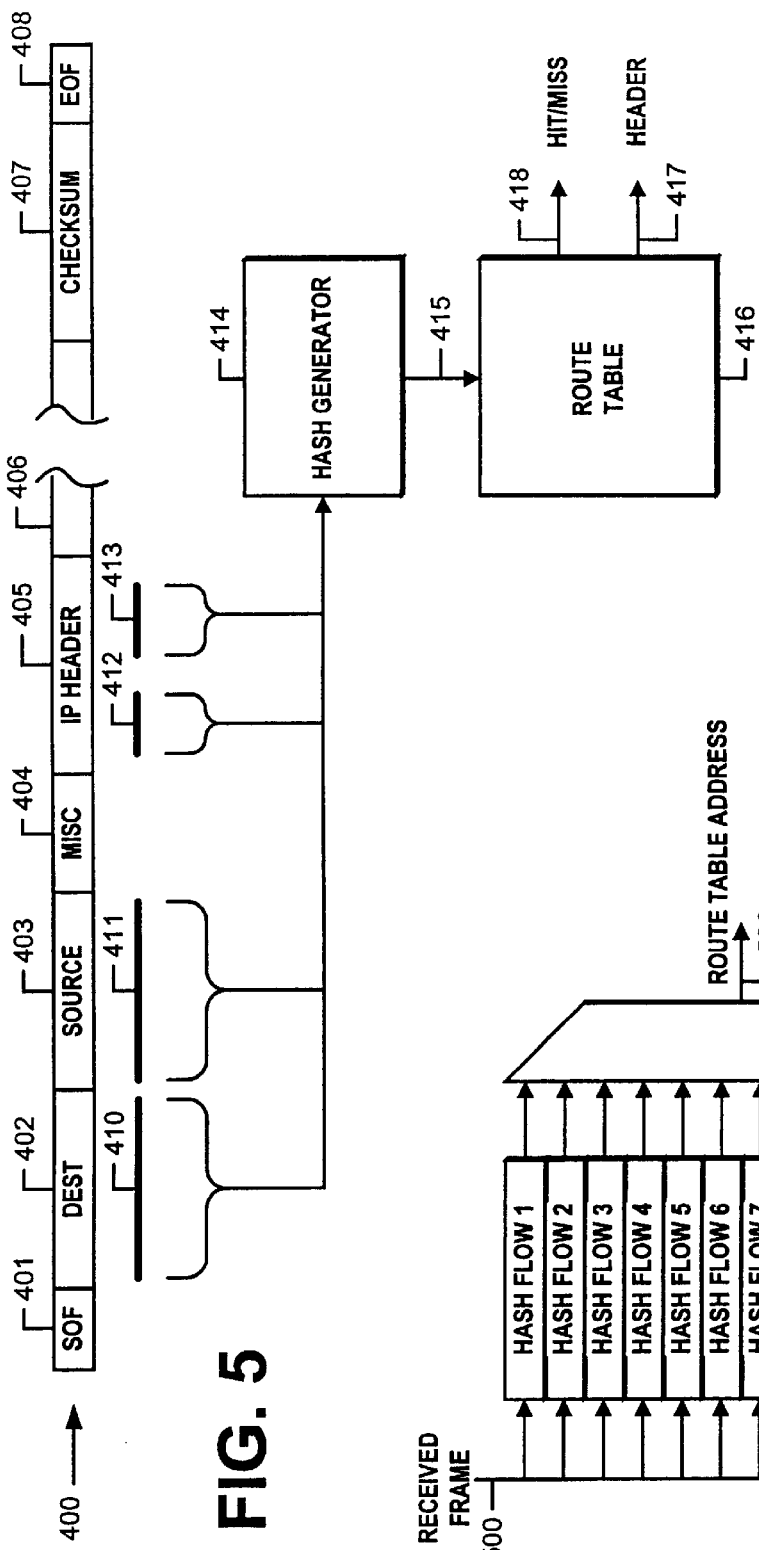
FIG. 5 is a diagram illustrating the process of generating identifying tags based on cyclic redundancy code hash generators for the flow detect logic of the system of FIG. 3.

FIG. 5 illustrates the technique executed by the flow detect logic in generating an identifying tag for the frame being received. FIG. 5 includes the format of a standard Ethernet (802.3) style frame 400. The frame includes a start of frame deliminator SOF in field 401. A destination address is carried in field 402. A source address is carried in field 403, and miscellaneous control. information is carried in additional fields 404. A network layer header, such as an Internet protocol header in this example, is found in field 405. Other style network layer headers could be used depending on the particular frame format. The data field of variable length is found at section 406 of the frame. The end of the frame includes a CRC-type checksum field 407 and an end-of-frame deliminator 408. The flow detect logic runs a CRC-type hash algorithm over selected fields in the control header of the frame to generate a pseudo-random tag. Thus, the field 410, the field 411, the field 412, and the field 413 are selected for input into a CRC hash generator 414. The tag generated by the hash generator 414 is supplied on line 415 for use in accessing the route table 416. The route table either supplies a route header on line 417, or indicates a miss on line 418. In this way, the route management software executed by the CPU can make the appropriate decisions.

The embodiment of FIG. 5 selects a particular set of fields within the frame for the purpose of generating the pseudo-random tag. The particular set of fields is selected to correspond to one standard frame format encountered in the network. However, a variety of frame formats may be transmitted within a single Ethernet style of network, although in this example, a CRC-type hash generator is utilized, relying on typical CRC-type algorithms, referred to as polynomial arithmetic, modulo II. This type of arithmetic is also referred to as "binary arithmetic with no carry" or serial shift exclusive-OR feedback. However, a variety of pseudo-random number generation techniques can be utilized, other than CRC-like algorithms. The two primary aspects needed for a suitable pseudo-random hash code are width and chaos, where width is the number of bits in the hash code, which is critical to prevent errors caused by the occurrence of packets which are unrelated but nonetheless result in the same hash being generated, and chaos is based on the ability to produce a number in the hash register that is unrelated to previous values.

Also, according to the present invention, the parsing of the frames incoming for the purposes of producing an address to the look-up table can take other approaches. This parsing can be referred to as circuit identification, because it is intended to generate a number that is unique to the particular path of the incoming frame.

The circuit identification method depends on verifying a match on specific fields of numbers in the incoming frame. There are two common table look-up methods, referred to as binary search and hash coding. The key characteristic of binary search is that the time to locate an entry is proportional to the log base 2 of the number of entries in the table. This look-up time is independent of the number of bits in the comparison, and the time to locate a number is relatively precisely known.

A second, more preferred, method of look-up is based on hash coding. In this technique, a subset of address field or other control fields of the frame are used as a short address to look into the circuit table. If the circuit table contains a match to the rest of the address field, then the circuit has been found. If the table contains a null value, then the address is known not to exist in the table. The hash method has several disadvantages. It requires a mostly empty table to be efficient. The time to find a circuit cannot be guaranteed. The distribution of duplicates may not be uniform, depending on the details of which fields are selected for the initial address generation.

The address degeneracy problem of the hash coding technique is reduced by processing the initial address fragment through a polynomial shift register. This translates the initial address to a uniformly-distributed random number. A typical example of random number generation is the CRC algorithm mentioned above. In a preferred hashing technique, the hardware on the flow switch includes at least a template register, pseudo-random number generation logic and a pseudo-random result register. The template register is loaded to specify bytes of a subject frame to be included in the hash code. The template specifies all protocol-dependent fields for a particular protocol. The fields are not distinguished beyond whether they are included in the hash or not. As the frame is processed, each byte of the initial header is either included in the hash function or it is ignored, based on the template. A hash function is generated based on the incoming packet and the template. The pseudo-random number generator is seeded by the input hash bits selected by the template. The change of a single bit in the input stream should cause a completely unrelated random number to be generated. Most common algorithms for generating pseudo-random numbers are linear-congruential, and polynomial shift methods known in the art. Of course, other pseudo-random number generation techniques are available.

A first field of the pseudo-random number is used as an address for the look-up table. The number of bits in this field depends on the dimensions of the look-up table. For example, if the circuit table has 64,000 possible entries, and the hash number is eight bytes long, the first two bytes are used as an address. The other six bytes are stored as a key in the hash table. If the key in the hash table matches the key in the hash code, then the circuit is identified. The additional bytes in the table for the addressed entry specify the route to be applied. The length of the pseudo-random hash code is critical, to account for the probability that two unrelated frames will result in the same hash number being generated. The required length depends on the size of the routing tables, and the rate of turnover of routes.

The problem with a pure hash code circuit identification technique is that there is a chance of randomly misrouting a packet. The problem arises when you are generating random numbers out of a larger set. There is a chance that two different input patterns will produce the same hash code. Typically, a hash code will be loaded into a table with a known route. Then a second, different, packet will appear that reduces to the same hash code as the one already in the table. The second packet will be falsely identified as having a known route, and will be sent to the wrong address. The exact mechanism of this error can be understood by the well-known statistics of the "birthday problem." The "birthday problem" answers the question, "What is the probability that two people in a group will have the same birthday?" It turns out that the number of people in a group required for there to be a likelihood of two people having the same birthday is quite small. For example, there is a 50% chance that two people out of a group of 23 will have the same birthday.

The probability of a switching error depends on the number of circuits active. For example, if there are no circuits active, then there is no chance that an invalid circuit will be confused with another circuit, since there are no valid circuits. As each circuit is added to the table, it decreases the remaining available space for other numbers by approximately $(\frac{1}{2})^{bits}$, where "bits" is the number of bits in the hash code. If the hash code is 32 bits long, then each entry into the circuit table will reduce the remaining code space by $(\frac{1}{2})^{32}$, which is equal to $2.32 \times 10^{-10}$. The cumulative probability of not making an error in the circuit table is equal to the product of the individual entry errors up to the size of the table. This is $(1)*(1\frac{1}{2}^{32})*(1\frac{2}{2}^{32})*(1\frac{3}{2}^{32}) \ldots (1-n/2^{32})$, where n is the number of entries in the table. In the case of a 32-bit hash code, and an 8,000-entry circuit table, the probability of making an error in the table would be about 0.7%. With a 64,000-entry circuit table, the probability of an error would be about 39%.

Using a 32-bit hash code and some typical-sized circuit tables indicates that the conventional wisdom is correct. That is, there will be routing errors if only a 32-bit hash code is used. However, if the number of bits in the hash code is increased and probability is recalculated for typical-sized circuit tables, we find that the probability of error quickly approaches zero for hash codes just slightly longer than 32 bits. For example, an 8,000-entry table with a 40-bit hash code will reduce the error rate to 0.003%. A 48-bit hash code will reduce the error to 0.000012%. These calculations show that a pure hash code look-up table can be used if the length of the hash code is longer than 32 bits for typical-size tables.

As a further example, consider the case of a 64-bit hash code. Assuming an 8,000-entry table, the probability of making an error is $2*10^{-12}$. Even if the table is completely replaced with new entries every 24 hours, it would take over one billion years for an error to occur. Using a 64-bit hash code with a 64,000-entry table would give a probability of error of $10^{12}$. Assuming the table turned over every day, it would take about 28 million years for an error to occur. An error might occur sooner, but the rate would be negligible. In all cases, there is no realistic chance of making an error based on this routing technique within the lifetime of typical networking equipment.

In a preferred embodiment, filtering mechanisms are implemented on the flow switch integrated circuit, and multiple filters operate in parallel. The circuit look-up table is implemented with external memory much larger than the number of circuits expected to be simultaneously active. This means that the hash pointer generated either points to a valid key or a miss is assumed. There is no linear search for matching key. When a circuit is not found in the table, the packet is routed to a default address. Normally, this default address directs the packet to a stored program router. The router will then parse the packet using standard methods, and then communicate with the flow switch circuit to update the circuit table with the correct entry. All subsequent packets are directly routed by the switch element without further assistance from the router.

Example template organizations for the bridging embodiment, the IP routing embodiment, and the IPX routing embodiment are set forth below.

Example for bridging:

| Basic ethernet packet: | Preamble 64 bits are discarded | |
|---|---|---|
| DestinationAddress: | bytes 1–6 | Used |
| SourceAddress: | bytes 7–12 | Used |
| Packet Type: | bytes 13–14 | are ignored (802.3 length) |
| Data bytes: | 15 up to 60 | are ignored |
| CRC: | Last 4 bytes | are ignored |

The template register is 8 bytes long. Each bit specifies one byte of the header. The first bit corresponds to byte 1 of the DestinationAddress.

The template for bridging is FF-F0-00-00 00-00-00-00

The selector is: Always TRUE. Hierarchy=1 (default to bridging)

Example for IP:

| Preamble 64 bits are discarded | | |
|---|---|---|
| Destination | bytes 1–6 | optional |
| Source | bytes 7 12 | optional |
| Packet type | bytes 13–14 | Ignore (802.3 length) |
| byte 15: | IP byte 1 | = version length = optional |
| byte 16: | IP byte 2 | = service type = Ignore |
| 17–18: | IP 3–4 | = length = Ignore |
| 19–22: | IP 5–8 | = Ignore |
| 23 | IP 9 | = TTL = optional |
| 24 | IP 10 | = Proto optional |
| 25–26 | IP 11–12 | = Hdr chksum = Ignore |
| 27–30 | JP 13–16 | = Source IP address = Used |
| 31–34 | IP 17–20 | = Destination IP address = Used |
| 35- | IP 21- | = Ignore |

Assume that optional fields are included in the pseudo-random hash code.

The template would then be: FF-F2-03-03 FC-00-00-00

The selector is: Bytes 13–15=080045, Hierarchy=2

Example for IPX in an Ethernet frame:

| Preamble 64 bits are discarded | | | |
|---|---|---|---|
| Destination | bytes 1–6 | Optional | |
| Source | bytes 7–12 | Optional | |
| Type | bytes 13–14 | Optional (Selector = 8137) | |
| byte | IPX | | |
| 15–6 | 1–2 | Checksum | Ignore |
| 17–18 | 3–4 | Length | Ignore |
| 19 | 5 | Hop count | Optional |
| 20 | 6 | Type | Optional (Selector = 2 or 4) |
| 21–24 | 7–10 | Dest Net | Use |
| 25–30 | 11–16 | Dest Host | Use |
| 31–32 | 17–18 | Dest Socket | Ignore |
| 33–36 | 19–22 | Src Net | Use |
| 37–42 | 23–28 | Src Host | Use |
| 43– | 29– | Ignore | |
| Template (with optional fields): | | | FF-FC-3F-FC FF-C0-00-00 |
| Selector: Bytes 13–14 = 8137, Hierarchy = 2 | | | |

The examples shown are representative, and may not correspond to what would actually be required for any particular application. There are many protocol pattern possibilities. Some combinations may not be resolvable with the hierarchy described in these three examples.

In the embodiment in which there are a number of filters operating in parallel, the flow detect logic includes the template register discussed above, a second register loaded with a template for detecting the specific protocol type represented by the template register. This feeds combinational logic that provides a boolean function, returning a true or false condition based on a string compare of a section of the frame to determine the protocol. A third register is loaded with a hierarchy number, which is used to arbitrate among similar protocols, which might simultaneously appear to be true based on the second protocol detect register. A fourth register is optional, and contains a memory start address which triggers the operation of the filter.

The multiple instantiations of the filters operate in parallel. The filters can be reprogrammed on the fly to support the exact types of traffic encountered. Furthermore, the filters may operate in a pipeline mode along a series of switching nodes. Each protocol returns its hierarchy number when that filter detects the protocol pattern contained in the template. For example, bridging protocol may be defined as true for hierarchy 1 for all frames. If no stronger filter fires, such as an EP or IPX filter, then the bridging filter will be selected as the default.

Figure 6:
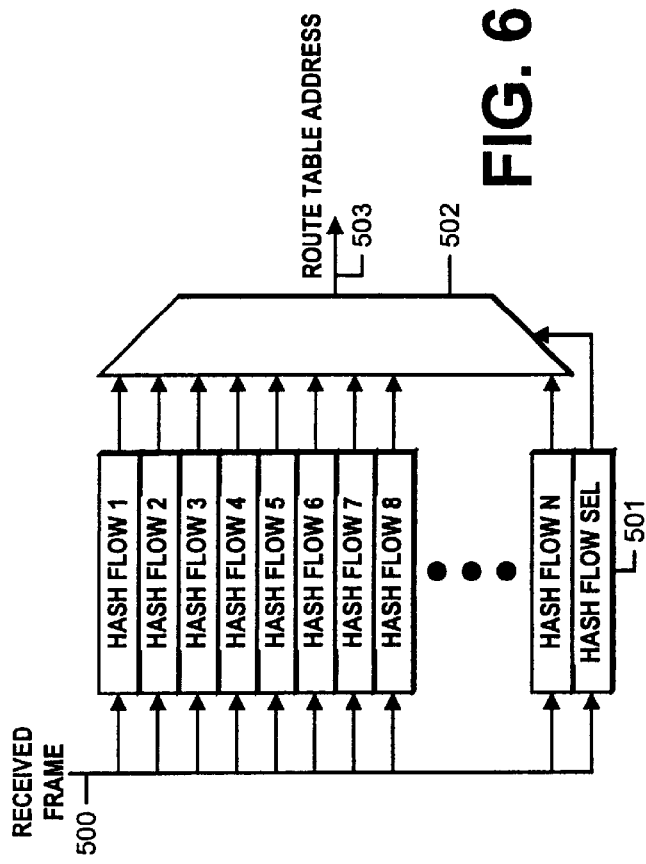
FIG. 6 is a simplified block diagram of the flow detect logic for multiple parallel flows for use in the system of FIG. 3.

Thus, the flow detect logic in a preferred system executes a plurality of hash flow analyses in parallel as illustrated by FIG. 6. Thus in FIG. 6, a received frame is supplied on line 500 in parallel to hash flow logic 1 through hash flow logic N, each flow corresponding to a particular frame format. Also, the received frame is supplied to a hash flow "select" 501 which is used for selecting one of the N flows. The output of flows 1 through N are supplied through multiplexer 502 in FIG. 6, which is controlled by the output of the select flow 501. The output of the select flow 501 causes selection of a single flow on line 503, which is used for accessing the route table by the CPU.

Thus a preferred embodiment of the present invention uses a routing technique base on flow signatures. Individual frames of data move from one of the Ethernet ports to a shared buffer memory at the node. As the data is being moved from the input port to the buffer, a series of hash codes is computed for various sections of the input data stream. Which bits are or are not included in each hash calculation is determined by a stored vector in a vector register corresponding to that calculation. For example, in the most common case of an IP packet, the hash function starts at the 96th bit to find the "0800" code following the link-layer source address, it then includes the "45" code, 32 bits of IP source, 32 bits of IP destination, skips to protocol ID 8 bits, and then at byte 20 takes the source port 16 bits and the destination port 16 bits. The result is a 64 bit random number identifying this particular IP flow.

The hash code is looked up in or used to access a local memory. If the code is found, it means that this flow type has been analyzed previously, and the node will know to apply the same routing as applied to the rest of the flow. If there is no entry corresponding to this hash code, it means that the flow has not been seen lately, and the node will route the frame to a default destination. A least recently used algorithm, or other cache replacement scheme, is used to age flow entries out of the local tables.

In practice, many filters operate simultaneously. For example, filters may be defined for basic bridging, IP routing, sub-variants, Apple Talk, and so on. The actual limit to the number of filters will be determined by the available space on the ASIC. The logic of the filters is basically the same for all the filters. The actual function of each filter is defined by a vector register specifying which bits are detected.

A second feature is the use of multi-level filters. In the common case simultaneously supporting bridging, IP, and IPX; about ten filters operate in parallel. An additional level of coding is used to select which of the other filters is to be used as the relevant hash code. This second level filter would detect whether the flow was IP or IPX for example.

In the case where the flow is not recognized, it is passed to the default route. As the packet passes along the default route, additional nodes may examine the packet and detect its flow type based on different filters or on a different set of flow signatures (hash table entries) stored. This method of cascading filters and tables allows for the total size and speed of the mesh to be expanded by adding nodes. Ultimately, if a packet can not be routed by any of the nodes along the default route, the packet will arrive at the final default router, typically a NetBuilder2. The default router will analyze the packet using standard parsing methods to determine its correct destination. A flow signature will be installed in an appropriate node, or nodes, of the mesh so that subsequent flows of the same signature can be routed autonomously without further intervention.

A flow effectively defines a "circuit" or a "connection"; however, in standard Ethernet design, packets are treated individually without any regard to a connection. Typically a router will analyze every single packet as if it had never seen it before, even though the router might have just processed thousands of identical packets. This is obviously a huge waste of routing resources. The automation of this flow analysis with multiple levels of parallel and cascaded hashing algorithms combined with a default router is believed to be a significant improvement over existing routing methods.

Flow based switching is also critical to ensuring quality of service guarantees for different classes of traffic.

Figure 7:
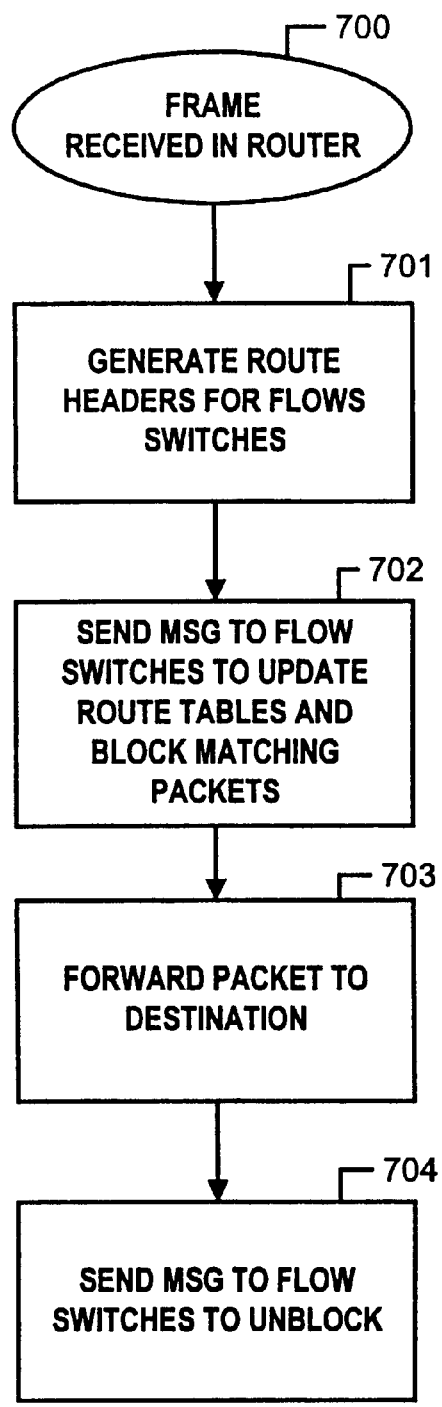
FIG. 7 is a flow chart illustrating the process executed in a router or other network route processor for frames received from the network switch, which do not have entries in the route tables of the network switch.

FIG. 7 is a flow chart illustrating the process executed in the router or other management node, whenever a frame is received which does not have a switch route header. Thus, the process of FIG. 7 begins at step 700 where a frame is received in the router, such as the router 150 in FIG. 2. The router applies the multiprotocol routing techniques to determine the destination of the frame. Based on the destination, and other information about the flows within the switch, switch route headers are generated for nodes in the switch (step 701). Thus, a different route header is generated for each node in the switch mesh, and correlated with the tag which would be generated according to the received frame at each node. Next, a message is sent to the nodes in the switch to update the route tables with the new route headers, and to block frames which match the tag of the frame being routed (block 702).

After step 702, the frame is forwarded from the router to its destination (step 703). After the frame has been forwarded to its destination, the router sends a message to all of the nodes in the switch to unblock frames which have a matching tag (step 704). This blocking and unblocking protocol is used to preserve the order in which frames are transmitted through the switch, by making sure that the first frame of a single flow arrives at its destination ahead of following frames.

Logic in the nodes for the purpose of accomplishing the blocking and unblocking operation take a variety of formats. In one example, the entry at each location in the route table includes a field which indicates whether the flow is blocked or not. When an entry is first made in the route table, the blocking field is set. Only after a special instruction is received to unblock the location, is the blocking field cleared, and use of the location allowed at the switch node.

Accordingly, in the preferred system the atomic network switch according to the present invention is based on repeated use of a simple 4-port switch integrated circuit. The integrated circuits are interconnected to create a mesh with a large pool of bandwidth across many ports. The links that interconnect the integrated circuits run according to a LAN protocol, at preferably 100 Megabits per second or higher, such as a gigabit per second. Individual ports act as autonomous routers between the boundaries of the switch according to the switch route protocol which is layered on top of the standard frame format. The overall bandwidth of the switch can be arbitrarily increased by adding more atomic nodes to the switch. Using a well-understood and simple interface based on standard Ethernet LAN protocols, vastly simplifies the implementation of each node in the switch, because each is able to rely on well understood MAC logic units and port structures, rather than proprietary complex systems of prior atomic LANS. Furthermore, any node of any switch can be connected to a physical layer device that connects to an Ethernet medium, or can be disconnected from the Ethernet medium and connected to another node switch to readily expand and change the topology of the switch. The fine granularity and scalability of the mesh architecture, combined with the ability to optimize the topology of the switch for a particular environment allow implementation of a high bandwidth, low cost network switch.

A high bandwidth and very flexible network switch is achievable according to the present invention with a simple, scalable, low-cost architecture.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. For a network switch including a mesh of interconnected network switch nodes a network switch node comprising:

a set of ports having more than two members, and the ports in the set including respective medium access control units for transmission and reception of data frames according to a network protocol the ports in the set of ports being connectable to a port on another network switch node inside the mesh, or to a network communication medium outside the mesh;

node route logic, coupled with the set of ports, which monitors frames received by the set of ports to route a received frame for transmission according to the network protocol to a selected port in the set of ports, including logic to select the selected port according to rules for navigating through the mesh inside to the network switch;

route table memory, coupled with the node route logic, having a set of accessible locations for storing switch route data; and flow detect logic, coupled with the set of ports, which monitors frames received by the set of ports and generates an identifying tag for use in accessing the route table memory; wherein the node route logic includes logic which determines whether the received frame includes a switch route field indicating a port in the set of ports, and if the received frame includes a switch route field, updates the switch route field, and forwards the received frame with the updated switch route field to the port indicated by the switch route field, and if the received frame does not include a switch route field, accesses the route table memory using the identifying tag generated in the flow detect logic to retrieve switch route data indicating a port in the set of ports, adds a switch route field to the received frame, and forwards the received frame with the switch route field to the port indicated by the switch route data, and the default location includes a default port and wherein the node route logic forwards the received frame for transmission on the default port in the set of ports when the switch route table does not include switch route data for the identifying tag.

2. The network switch node of claim 1, wherein the network protocol comprises a connectionless protocol.

3. The network switch node of claim 1, wherein the network protocol comprises an Ethernet protocol.

4. The network switch node of claim 1, wherein the network protocol comprises an Ethernet, full duplex protocol.

5. The network switch node of claim 1, wherein ports in the set of ports include medium independent interfaces for the network protocol.

6. The network switch node of claim 1, wherein the default port is coupled to a route to a multi-protocol, network route processor at which switch route data is generated.

7. The network switch node of claim 6, including logic to receive switch route data from a remote system for a particular identifying tag, to store the switch route data in the route table memory in association with the particular identifying tag, and to block frames having the particular identifying tag until notification is received that it is clear to forward frames having the particular identifying tag, and after notification is received that it is clear to forward frames having the particular identifying tag, forward frames having the particular tag according to the switch route data.

8. For a network switch including a mesh of interconnected network switch nodes, a network switch node comprising:

a set of ports having more than two members, and the ports in the set including respective medium access control units for transmission and reception of data frames according to a network protocol, the ports in the set of ports being connectable to a port on another network switch node inside the mesh, or to a network communication medium outside the mesh;

node route logic, coupled with the set of ports, which monitors frames received by the set of ports to route a received frame for transmission according to the network protocol to a selected port in the set of ports, including logic to select the selected port according to rules for navigating through the mesh inside to the network switch;

route table memory, coupled with the node route logic, having a set of accessible locations for storing switch route data; and flow detect logic, coupled with the set of ports, which monitors frames received by the set of ports and generates an identifying tag for use in accessing the route table memory; wherein the node route logic includes logic which determines whether the received frame includes a switch route field indicating a port in the set of ports, and if the received frame includes a switch route field, updates the switch route field, and forwards the received frame with the updated switch route field to the port indicated by the switch route field, and if the received frame does not include a switch route field, accesses the route table memory using the identifying tag generated in the flow detect logic to retrieve switch route data indicating a port in the set of ports, adds a switch route field to the received frame, and forwards the received frame with the switch route field to the port indicated by the switch route data, and the default location includes a default port and wherein the node route logic forwards the received frame for transmission on the default port in the set of ports when the route table memory does not include switch route data for the identifying tag;

the network switch node further including logic to receive route data from a remote system for a particular identifying tag, to store the switch route data in the route table memory in association with the particular identifying tag, and to block frames having the particular identifying tag until notification is received that it is clear to forward frames having the particular identifying tag, and after notification is received that it is clear to forward frames having the particular identifying tag, forward frames having the particular tag according to the switch route data.

9. The network switch node of claim 8, herein the default port is coupled to a route to a multi-protocol, network route processor at which switch route data is generated.

10. The network switch node of claim 1, wherein the flow detect logic comprises:

logic which computes a plurality of hash values in response to respective sets of control fields in a received frame, where the respective sets of control fields correlate with respective network frame formats; and logic which determines a particular network frame format for a received frame, and selects one of the plurality of hash values as the identifying tag in response to the particular network frame format.

11. The network switch node of claim 10, wherein the hash values comprise pseudo-random codes.

12. The network switch node of claim 1, wherein the flow detect logic comprises:

logic which computes a hash value in response to a set of control fields in a received frame, where the set of control fields correlates with a network frame format, and applies the hash value as the identifying tag.

13. The network switch node of claim 12, wherein the hash value comprises a pseudo-random code.

14. The network switch node of claim 1, wherein the network protocol comprises an Ethernet protocol, specified for operation at 100 Megabits per second.

15. The network switch node of claim 14, wherein the Ethernet protocol comprises a full duplex protocol.

16. The network switch node of claim 1, wherein said set of ports and said node route logic comprise elements of a single integrated circuit.

17. The network switch node of claim 16, wherein ports in the set of ports include medium independent interfaces for the network protocol, and the network protocol comprises an Ethernet protocol, specified for operation at 100 Megabits per second or higher.

18. The network switch node of claim 17, in the Ethernet protocol comprises a full duplex protocol.

19. The network switch node of claim 1, wherein ports of the set of ports include medium independent interfaces for the network protocol, the medium independent interfaces defining a particular bus configuration, and further including connectors coupled to the medium independent interfaces adapted to receive cables configured according to the particular bus configuration.

20. An integrated circuit, comprising:

a set of ports for access to respective communication media, the set of ports having more than two members, and the ports in the set including respective medium access control logic for a network protocol;

a memory interface for connection to a route table memory having a set of accessible locations for storing switch route data;

flow detect logic, coupled with the set of ports, which monitors frames received by the set of ports and generates an identifying tag for use in accessing the route table memory; and node route logic, coupled with the flow detect logic, the memory interface and the set of ports, which monitors frames received by the set of ports to route a received frame for transmission to a port in the set of ports, the node route logic determining whether the received frame includes a switch route field indicating a port in the set of ports, and if the received frame includes a switch route field, updates the switch route field, and forwards the received frame with the updated switch route field to the port indicated by the switch route field, and if the received frame does not include a switch route field, accesses the route table memory through the memory interface using the identifying tag generated in the flow detect logic to retrieve switch route data indicating a port in the set of ports, adds a switch route field to the received frame, and forwards the received frame with the switch route field to the port indicated by the switch route data;

wherein the default location includes a default port and wherein the node route logic forwards the received frame for transmission on the default port in the set of ports when the switch route table does not include switch route data for the identifying tag.

21. The integrated circuit of claim 20, wherein the network protocol comprises a connectionless protocol.

22. The integrated circuit of claim 20, wherein the network protocol comprises an Ethernet protocol.

23. The integrated circuit of claim 22, wherein the Ethernet protocol comprises a full duplex protocol.

24. The integrated circuit of claim 20, herein ports in the set of ports include medium independent interfaces for the network protocol.

25. The integrated circuit of claim 20, including logic to receive switch route data from a remote system for a particular identifying tag, to store the switch route data in the route table memory in association with the particular identifying tag, and to block frames having the particular identifying tag until notification is received that it is clear to forward frames having the particular identifying tag, and after notification is received that it is clear to forward frames having the particular identifying tag, forward frames having the particular identifying tag according to the switch route data.

26. An integrated circuit comprising:

a set of ports for access to respective communication media the set of ports having more than two members, and the ports in the set including respective medium access control logic for a network protocol:

a memory interface for connection to a route table memory having a set of accessible locations for storing switch route data;

flow detect logic, coupled with the set of ports, which monitors frames received by the set of ports and generates an identifying tag for use in accessing the route table memory: and node route logic, coupled with the flow detect logic, the memory interface and the set of ports, which monitors frames received by the set of ports to route a received frame for transmission to a port in the set of ports, the node route logic determining whether the received frame includes a switch route field indicating a port in the set of ports, and if the received frame includes a switch route field, updates the switch route field, and forwards the received frame with the updated switch route field to the port indicated by the switch route field, and if the received frame does not include a switch route field, accesses the route table memory through the memory interface using the identifying tag generated in the flow detect logic to retrieve switch route data indicating a port in the set of ports, adds a switch route field to the received frame, and forwards the received frame with the switch route field to the port indicated by the switch route data:

wherein the default location includes a default port and wherein the node route logic forwards the received frame for transmission on the default port in the set of ports when the route table memory does not include switch route data for the identifying tag;

the network switch node further including logic to receive switch route data from a remote system for a particular identifying tag, to store the switch route data in the route table memory in association with the particular identifying tag, and to block frames having the particular identifying tag until notification is received that it is clear to forward frames having the particular identifying tag, and after notification is received that it is clear to forward frames having the particular identifying tag, forward frames having the particular identifying tag according to the route data.

27. The integrated circuit of claim 20, wherein the flow detect logic comprises:

logic which computes a plurality of hash values in response to respective sets of control fields in a received frame, where the respective sets of control fields correlate with respective network frame formats; and logic which determines a particular network frame format for a received frame, and selects one of the plurality of hash values as the identifying tag in response to the particular network frame format.

28. The integrated circuit of claim 27, wherein the hash values comprise pseudo-random codes.

29. The integrated circuit of claim 20, wherein the flow detect logic comprises:

logic which computes a hash value in response to set of control fields in a received frame, where the set of control fields correlates with a network frame format, and applies the hash value as the identifying tag.

30. The integrated circuit of claim 29, wherein the hash value comprises a pseudo-random code.

31. The integrated circuit of claim 20, including an embedded bus interconnecting the set of ports, the flow detect logic, the node route logic and the memory interface.

32. The integrated circuit of claim 20, wherein the network protocol comprises an Ethernet protocol, specified for operation at 100 Megabits per second or higher.

33. The integrated circuit of claim 32, wherein the Ethernet protocol comprises a full duplex protocol.

34. The integrated circuit of claim 32, including a bi-directional, embedded bus interconnecting the set of ports, the flow detect logic, the node route logic and the memory interface, the embedded bus specified for operation at 1 Gigabit per second or higher.

35. The integrated circuit of claim 20 including the route table memory on the integrated circuit.

36. A network switch, comprising:

a plurality of switch nodes;

a first set of communication links, communication links in the first set coupled between switch nodes in the plurality of switch nodes internal to the network switch;

a second set of communication links, communication links in the second set comprising network links external to the network switch;

the respective switch nodes in the plurality of switch nodes including a set of ports connected to respective communication links in either the first set of communication links or the second set of communication links, the set of ports having more than two members, and the ports in the set including respective medium access control logic for a network protocol;

route table memory having a set of accessible locations for storing switch route data which specify routes through the plurality of switch nodes;

flow detect logic, coupled with the set of ports, which monitors frames received by the set of ports and generates an identifying tag for use in accessing the route table memory; and node route logic, coupled with the flow detect logic, the route table memory and the set of ports, which monitors frames received by the set of ports to route a received frame for transmission to a port in the set of ports, the node route logic determining whether the received frame includes a switch route field indicating a port in the set of ports, and if the received frame includes a switch route field, updates the switch route field, and forwards the received frame with the updated switch route field to the port indicated by the switch route field, and if the received frame does not include a switch route field, accesses the route table memory using the identifying tag generated in the flow detect logic to retrieve switch route data indicating a port in the set of ports, adds a switch route field to the received frame, and forwards the received frame with the switch route field to the port indicated by the switch route data;

wherein the default location includes a default port and wherein the node route logic on the respective switch nodes forwards the received frame for transmission on the default port in the set of ports when the switch route table does not include switch route data for the identifying tag.

37. The network switch of claim 36, wherein the network protocol for ports in the set of ports on the respective switch nodes comprises a connectionless protocol.

38. The network switch of claim 36, wherein the network protocol for ports in the set of ports on the respective switch nodes comprises an Ethernet protocol.

39. The network switch of claim 38, Wherein the Ethernet protocol comprises a full duplex protocol.

40. The network switch of claim 36, wherein ports in the set of ports on the respective switch nodes include medium independent interfaces for the network protocol.

41. The network switch of claim 36, wherein the default port is coupled to a route to a multi-protocol, network route processor at which switch route data is generated.

42. The network switch of claim 36, logic on the respective switch nodes to receive switch route data from a remote system for a particular identifying tag, to store the switch route data in the route table memory in association with the particular identifying tag, and to block frames having the particular identifying tag until notification is received that it is clear to forward frames having the particular identifying tag, and after notification is received that it is clear to forward frames having the particular identifying tag, forward frames having the particular identifying tag according to the switch route data.

43. A network switch, comprising:

a plurality of switch nodes;

a first set of communication links, communication links in the first set coupled between switch nodes in the plurality of switch nodes internal to the network switch, a second set of communication links, communication links in the second set comprising network links external to the network switch, the respective switch nodes in the plurality of switch nodes including a set of ports connected to respective communication links in either the first set of communication links or the second set of communication links, the set of ports having more than two members, and the ports in the set including respective medium access control logic for a network protocol, route table memory having a set of accessible locations for storing switch route data which specify routes through the plurality of switch nodes;

flow detect logic, coupled with the set of Ports, which monitors frames received by the set of ports and generates an identifying tag for use in accessing the route table memory;

node route logic, coupled with the flow detect logic, the route table memory and the set of ports, which monitors frames received by the set of ports to route a received frame for transmission to a port in the set of ports, the node route logic determining whether the received frame includes a switch route field indicating a port in the set of ports, and if the received frame includes a switch route field, updates the switch route field, and forwards the received frame with the updated switch route field to the port indicated by the switch route field, and if the received frame does not include a switch route field, accesses the route table memory using the identifying tag generated in the flow detect logic to retrieve switch route data indicating a port in the set of ports, adds a switch route field to the received frame, and forwards the received frame with the switch route field to the port indicated by the switch route data;

wherein the node route logic on the respective switch nodes forwards the received frame for transmission on a default port in the set of ports when the route table memory does not include switch route data for the identifying tag;

the network switch node further including logic on the respective switch nodes to receive switch route data from a remote system for a particular identifying tag, to store the switch route data in the route table memory in association with the particular identifying tag, and to block frames having the particular identifying tag until notification is received that it is clear to forward frames having the particular identifying tag, and after notification is received that it is clear to forward frames having the particular identifying tag, forward frames having the particular identifying tag according to the switch route data.

44. The network switch of claim 43, wherein the default port is coupled to a route to a multi-protocol, network route processor at which switch route data is generated.

45. The network switch of claim 39, wherein the flow detect logic on the respective switch nodes comprises:

logic which computes a plurality of hash values in response to respective sets of control fields in a received frame, where the respective sets of control fields correlate with respective network frame formats; and logic which determines a particular network frame format for a received frame, and selects one of the plurality of hash values as the identifying tag in response to the particular network frame format.

46. The network switch of claim 45, wherein the hash values comprise pseudo-random codes.

47. The network switch of claim 36, wherein the flow detect logic on the respective switch nodes comprises:

logic which computes a hash value in response to set of control fields in a received frame, where the set of control fields correlates with a network frame format, and applies the hash value as the identifying tag.

48. The network switch of claim 47, wherein the hash value comprises a pseudo-random code.

49. The network switch of claim 36, wherein the network protocol for ports in the set of ports on the respective switch nodes comprises an Ethernet protocol, specified for operation at 100 Megabits per second or higher.

50. The network switch of claim 49, wherein the Ethernet protocol comprises a full duplex protocol.

51. The network switch of claim 36, wherein the MAC logic for ports in the set of ports on the respective switch nodes executes the same network protocol for all ports in the set of ports.

52. The network switch of claim 36, wherein ports in the set of ports on the respective switch nodes include medium independent interfaces for the network protocol, the medium independent interfaces defining a particular bus configuration, and further include connectors coupled to the medium independent interfaces adapted to receive cables configured according to the particular bus configuration.

* * * * *